(12) United States Patent
Nakamuta

(10) Patent No.: US 8,229,288 B2
(45) Date of Patent: Jul. 24, 2012

(54) STREAM DATA REPRODUCTION SYSTEM

(75) Inventor: Kazuhiro Nakamuta, Gunma-ken (JP)

(73) Assignees: Semiconductor Components Industries, LLC, Phoenix, AZ (US); Sanyo Semiconductor Co., Ltd., Gunma (JP)

(*) Notice: Subject to any disclaimer, the term of this patent is extended or adjusted under 35 U.S.C. 154(b) by 1330 days.

(21) Appl. No.: 11/866,303

(22) Filed: Oct. 2, 2007

(65) Prior Publication Data

US 2008/0145028 A1    Jun. 19, 2008

(30) Foreign Application Priority Data

Oct. 13, 2006  (JP) .................................. 2006-280080

(51) Int. Cl.
H04N 5/93 (2006.01)
H04N 9/80 (2006.01)
H04N 5/76 (2006.01)
H04N 5/917 (2006.01)
G11C 7/00 (2006.01)
G11C 7/04 (2006.01)
G11C 11/34 (2006.01)
G11C 8/00 (2006.01)

(52) U.S. Cl. ........ 386/353; 386/239; 386/237; 386/354; 386/355; 386/356; 365/205; 365/212; 365/214; 365/230.06

(58) Field of Classification Search .................. 386/239, 386/237, 353, 354, 355, 356; 365/205, 212, 365/214, 230.06
See application file for complete search history.

(56) References Cited

U.S. PATENT DOCUMENTS 4,961,169 A * 10/1990 Matsumura et al. ...... 365/189.12
6,134,272 A * 10/2000 Rim .......................... 375/240.27
6,161,159 A * 12/2000 Suzuki .......................... 710/307
7,206,234 B2 * 4/2007 Pan et al. ....................... 365/194

FOREIGN PATENT DOCUMENTS

| JP | 11-212904 | 8/1999 |
| JP | 2000-347987 | 12/2000 |
| JP | 2003-216195 | 7/2003 |

OTHER PUBLICATIONS

Japan Patent Office, Notification of Reasons for Rejection for Application No. 2006-280080, Mail Date Oct. 4, 2011.

* cited by examiner

*Primary Examiner* — Daquan Zhao

(74) *Attorney, Agent, or Firm* — SoCal IP Law Group LLP; Steven C. Sereboff; John E. Gunther

(57) ABSTRACT

A stream data reproducing system comprising: an input buffer configured to accumulate stream data input from a stream source; a decode circuit configured to decode the stream data accumulated in the input buffer by predetermined processing unit to generate decode data; an output buffer configured to output the decode data after accumulation thereof; a transfer memory cell configured to store the stream data accumulated in the input buffer and the decode data generated in the decode core circuit; and a data transfer control circuit configured to control transfer of the stream data by the processing unit from the input buffer to the transfer memory cell, and transfer of the decode data by the processing unit from the transfer memory cell to the output buffer.

6 Claims, 10 Drawing Sheets

STREAM DATA REPRODUCTION SYSTEM

CROSS-REFERENCE TO RELATED APPLICATION

This application claims the benefit of priority to Japanese Patent Application No. 2006-280080, filed Oct. 13, 2006, of which full contents are incorporated herein by reference.

BACKGROUND OF THE INVENTION

1. Field of the Invention

The present invention relates to a stream data reproducing system.

2. Description of the Related Art

A stream processing method is a method for reading data flowing without interruption (hereinafter referred to as stream data) to be processed next, while starting processing of the stream data including a header portion concurrently with the detection of the header portion of the stream data, instead of executing predetermined processing after reading all the data in a memory of a personal computer or the like.

Examples of such stream data, in the MPEG method known as a data compression/extension technology, include a data string of video data encoded in compliance with an MPEG video part (video stream data), a data string of audio data encoded in compliance with an MPEG audio part (audio stream data), a data string (system stream data) obtained by time-division multiplexing and merging the MPEG video stream data and MPEG audio stream data in compliance with an MPEG system part and the like. Supply sources of the streams (hereinafter referred to as a "stream source") cover a broad spectrum including optical discs such as CD-ROM, DVD and the like, memory devices such as a flash memory for a portable audio device and the like, antennas for Broadcasting Satellite (to be known as BS), digital terrestrial broadcast, or car navigation systems or the like.

FIG. 10 is a diagram illustrating the configuration of a stream data reproducing system. In the following, for the sake of convenience of explanation, an MPEG audio stream data reproducing system stored in an optical disc will be described as an example of a stream data reproducing system (See Japanese Patent Laid-Open No. 2003-216195, for example).

A stream source 10 is an optical disc in which audio stream data compressed by an MPEG inter-frame prediction is stored. A single frame (referred to as AAU (Audio Access Unit)) constituted by a plurality of words, which is a decodable minimum processing unit of such audio stream data includes a header, an error correcting code, and audio data, from the beginning to the end.

An input buffer 20 is a buffer constituted by an FIFO ring buffer, for example, for sequentially accumulating audio stream data read out by an optical pickup from the stream source 10 and A/D converted.

An output buffer 30 is a buffer constituted by an FIFO ring buffer, for example, similarly to the input buffer 20, for sequentially accumulating decode data generated as a decode result of the audio stream data by a DSP 50.

An output device 40 is constituted by an amplifier-mounted speaker, for example, and outputs voice of decode data sequentially supplied from the output buffer 30 and D/A converted.

The DSP (digital Signal Processor) 50 is generally characterized by: being provided with a DSP core 52 including a product-sum multiplier which is able to execute product-sum operation at a high speed or the like; employment of a Harvard architecture in which a data memory 51 and a program memory 53 are separated and accessed independently from the DSP core 52; etc. The DSP 50 executes the following decode processing for the audio stream data accumulated in the input buffer 20.

That is, the DSP core 52 detects a header portion of each single frame of the audio stream data accumulated in the input buffer 20, and outputs a read request to the input buffer 20 based on the detection result. As a result, the audio stream data is read out by the unit of a single word from the input buffer 20 to input to the DSP 50. The DSP core 52 outputs a write request to the data memory 51, to write the audio stream data read out from the input buffer 20 into a predetermined region (stream buffer) of the data memory 51.

The DSP core 52 reads out an MPEG decode processing program stored in the program memory 53, to execute predetermined decode processing (extension processing or the like) to the audio stream data stored in the data memory 51. The decode data generated by the result of decode processing is written in a predetermined region (decode buffer) of the data memory 51 by the DSP 52. And the DSP core 52 outputs a read request to the data memory 51, reads out the decode data stored in the data memory 51 by the unit of a single word, and supplies it to the output buffer 30. As a result, voice output is made from the output device 40, and decode processing by the DSP 50 is completed.

In an example illustrated in FIG. 10, the DSP core 52 reads out the audio stream data from the input buffer 20, to be extended into the data memory 51. The DSP core 52 also reads out the decode data written in the data memory 51, to be written into the output buffer 30.

Such a stream data reproducing system employs a system that data transfer is repeatedly carried out by the unit of one word between the input/output buffer and the DSP. Thus, a processing load according to the data transfer with the input/output buffer makes up a large proportion of the entire processing load of the DSP, which hinders innate decode processing of the DSP.

SUMMARY OF THE INVENTION

A stream data reproducing system according to an aspect of the present invention, comprises: an input buffer configured to accumulate stream data input from a stream source; a decode core circuit configured to decode the stream data accumulated in the input buffer by predetermined processing unit to generate decode data; an output buffer configured to output the decode data after accumulation thereof; a transfer memory cell configured to store the stream data accumulated in the input buffer and the decode data generated in the decode core circuit; and a data transfer control circuit configured to control transfer of the stream data by the processing unit from the input buffer to the transfer memory cell, and transfer of the decode data by the processing unit from the transfer memory cell to the output buffer.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

<Configuration of Stream Data Reproducing System>

Figure 1:
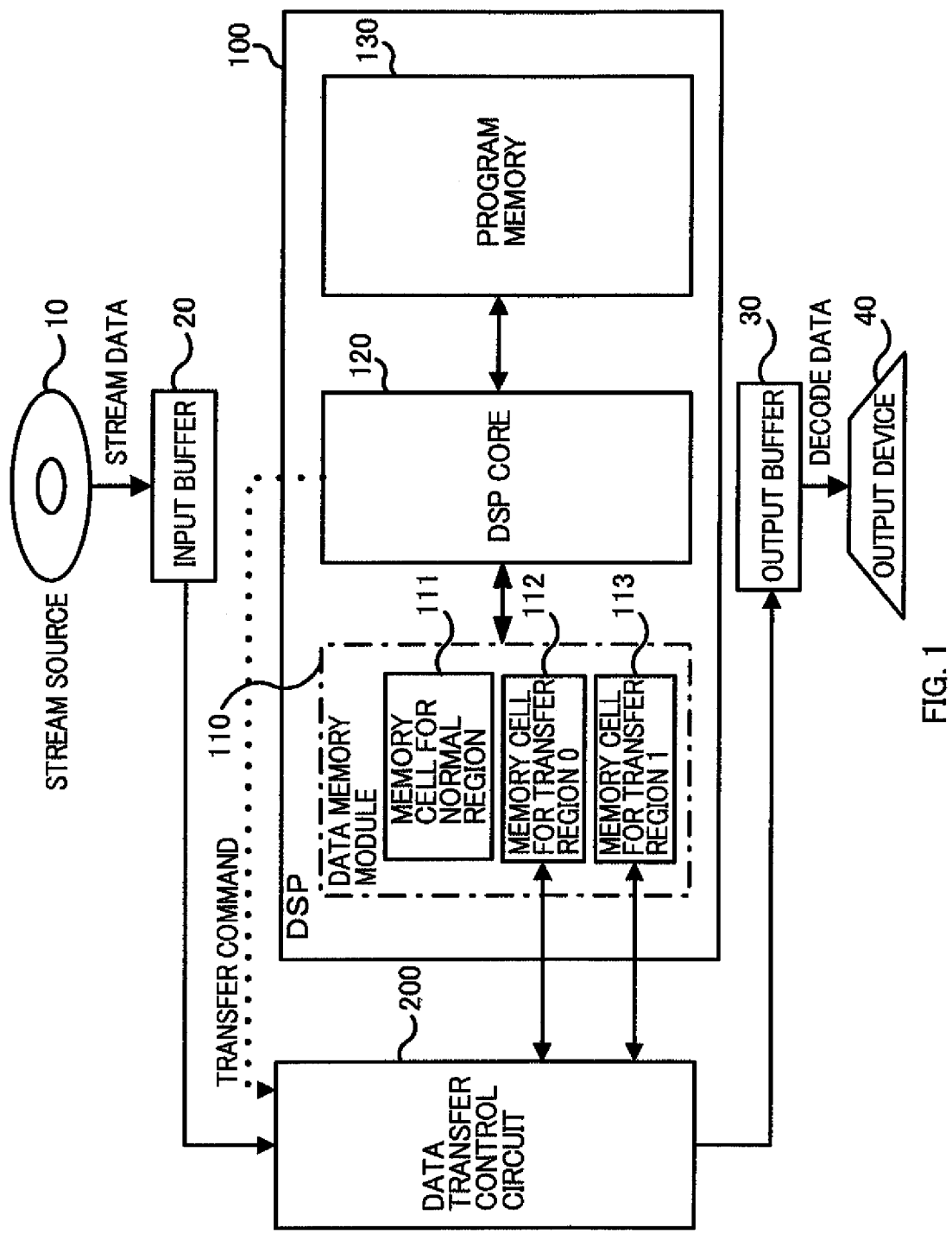
FIG. 1 is a diagram illustrating a configuration of a stream data reproducing system according to an embodiment of the present invention.

FIG. 1 is a diagram illustrating a configuration of a stream data reproducing system according to an embodiment of the present invention. The same elements in the stream data reproducing system shown in FIG. 10 (stream source 10, input buffer 20, output buffer 30, and output device 40) are given the same reference numerals and the descriptions thereof are omitted.

Figure 10:
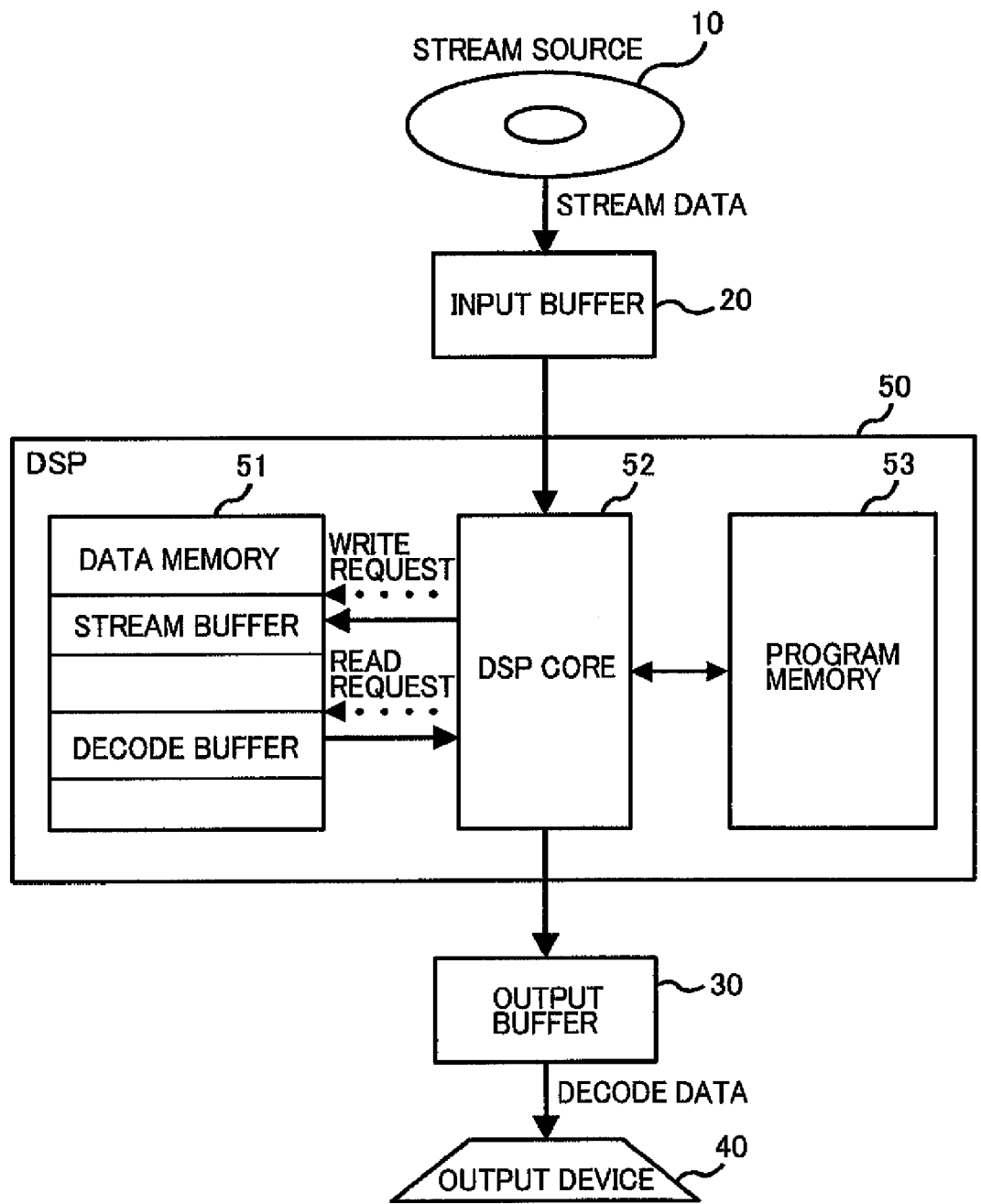
FIG. 10 is a diagram illustrating a configuration of a stream data reproducing system.

Similarly to the stream data reproducing system shown in FIG. 10, an MPEG audio stream data reproducing system stored in an optical disc is described as an example, however, stream data according to an embodiment of the present invention may be MPEG video stream data or system stream data, and stream data reproducing system according to an embodiment of the present invention may be a portable audio player, BS or terrestrial digital broadcast receiver and the like.

Two differences in configuration between the stream data reproducing system according to an embodiment of the present invention shown in FIG. 1 and the stream data reproducing system shown in FIG. 10 are a data memory module 110 of a DSP 100 and a data transfer control circuit 200.

The DSP 100, which includes a product-sum multiplier and the like, is provided with a DSP core 120 (decode core circuit) for decode processing of stream data, and employs Harvard architecture in which a data memory module 110 and a program memory 130 are separated and each of them is accessed independently from the DSP core 120.

Here, the data memory module 110 is a memory for reading/writing data similarly to the data memory 51, however, it is a memory module that integrates memory cell 111 for a normal region, a memory cell 112 for transfer region 0, and a memory cell 113 for transfer region 1, which are physically independent from each other, to be managed collectively by an address space for the data memory in the DSP core 120.

The normal region memory cell 111 includes a memory cell for reading/writing normal data other than: audio stream data transferred from the input buffer 20 through a data transfer control circuit 200 to the DSP 100; and decode data transferred from the DSP 100 through the data transfer control circuit 200 to the output buffer 30. A region of the normal region memory cell 111 in the entire region of the data memory module 110 is referred to as a "normal region."

The memory cell 112 for transfer region 0 includes a memory cell for storing the audio stream data transferred from the input buffer 20 through the data transfer control circuit 200. A region of the memory cell 112 for transfer region 0 in the entire region of the data memory module 110 is referred to as a "transfer region 0." Also, to read out audio stream data from the input buffer 20 in which audio stream data read out from the stream source 10 has been accumulated and to write the audio stream data read out from the input buffer 20 into the memory cell 112 for transfer region 0 through the data transfer control circuit 200 is hereinafter referred to as "read transfer." That is, the memory cell 112 for transfer region 0 corresponds to a read transfer destination, and the input buffer 20 to a read transfer source.

The memory cell 113 for transfer region 1 includes a memory cell for storing decode data to be transferred to the output buffer 30 through the data transfer control circuit 200. A region of the memory cell 113 for transfer region 1 in the entire region of the data memory module 110 is referred to as a "transfer region 1." Also, to read out the decode data from the memory cell 113 for transfer region 1 through the data transfer control circuit 200, to be written in the output buffer 30 is hereinafter referred to as "write transfer." That is, the memory cell 113 for transfer region 1 corresponds to a write transfer source and the output buffer 30 corresponds to a write transfer destination.

As mentioned above, by physically separating: the normal region memory cell 111 used as normal data memory; the memory cell 112 for transfer region 0; and the memory cell 113 for transfer region 1, which are used as transfer regions for stream data or decode data, even during the transfer of the stream data or decode data, the DSP core 120 can execute other processing with using the normal region memory cell 111.

With regard to the memory cell 112 for transfer region 0 and the memory cell 113 for transfer region 1, an access thereto from the DSP core 120 is prohibited during read transfer or write transfer, however, an access thereto from the DSP core 120 is allowed as an access to normal data memory during the period other than the read transfer or write transfer, just as the normal transfer memory cell 111. Also, the memory cell 112 for transfer region 0 and the memory cell 113 for transfer region 1 are controlled such that both the read transfer and write transfer can be executed by switching.

The data transfer control circuit 200 controls transfer of the audio stream data from the input buffer 20 to the memory cell 112 for transfer region 0 or the memory cell 113 for transfer region 1, as well as transfer of decode data from the memory cell 112 for transfer region 0 or the memory cell 113 for transfer region 1 to the output buffer 30. The data transfer control circuit 200 executes transfer control of the audio stream data or decode data according to a transfer command from the DSP core 120.

Therefore, the data transfer control circuit 200 is able to execute the above transfer control without through the DSP core 120 after receiving the transfer command from the DSP core 120, so that a processing load of the entire DSP core 120 can be reduced. Also, by the reduction of the processing load, other processing functions can easily be added to the DSP core 120 and an operating frequency thereof can easily be lowered.

<Configuration of Data Transfer Control Circuit>

Figure 2:
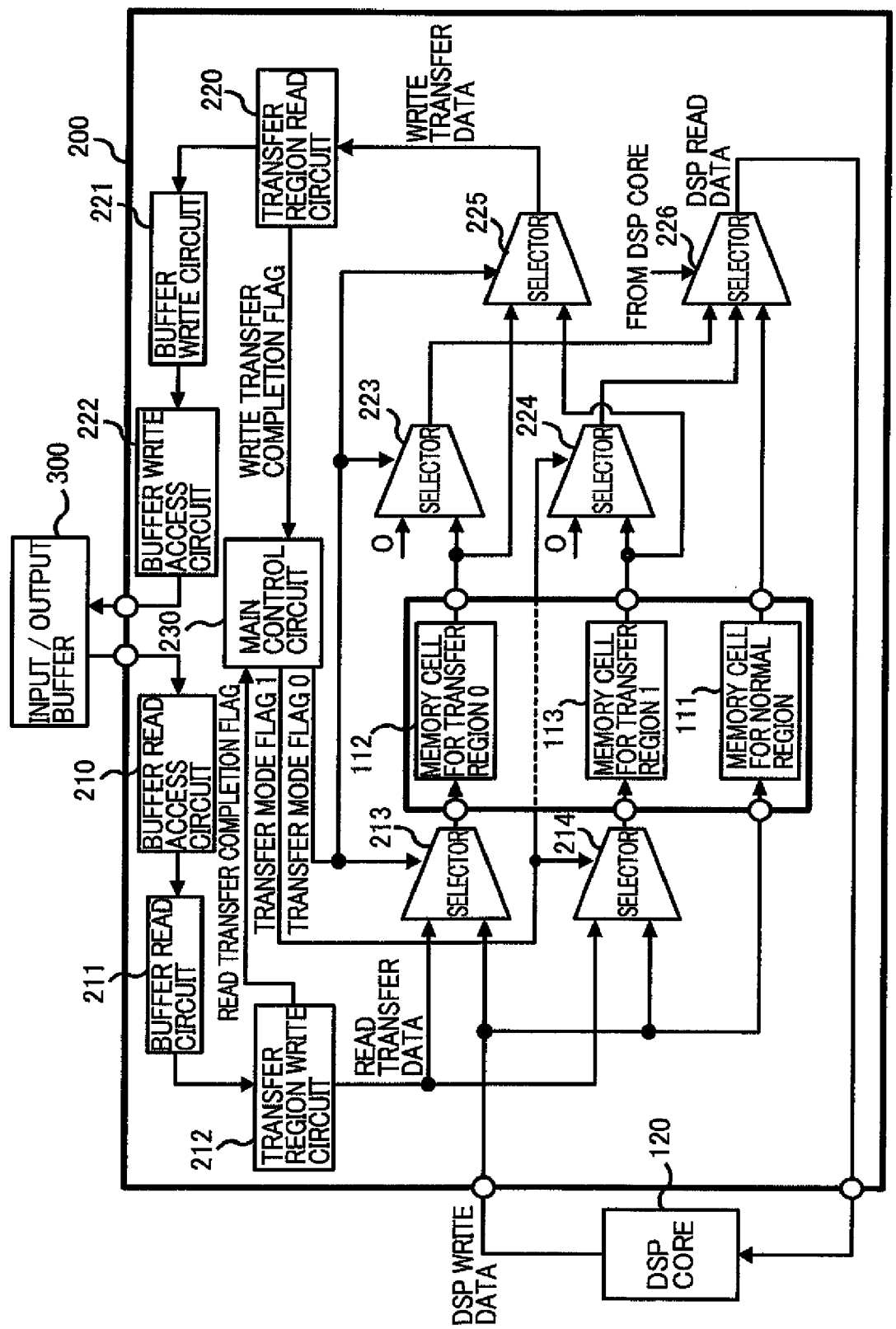
FIG. 2 is a diagram illustrating a configuration of a data transfer control circuit according to an embodiment of the present invention.

FIG. 2 is a diagram illustrating a configuration of the data transfer control circuit 200 according to an embodiment of the present invention. In FIG. 2, the memory cell 112 for transfer region 0 corresponds to a read transfer destination and the memory cell 113 for transfer region 1 corresponds to a write transfer source.

An input/output t buffer 300, as which the input buffer 20 and the output buffer 30 are collectively referred to, is a memory of audio stream data provided outside the DSP 100. Although the input/output buffer 300 may be provided inside the DSP 100, in general it is preferably provided outside the DSP 100 in order to reduce in size of a circuit of the DSP 100.

A main control circuit 230 is a circuit governing control of the entire data transfer control circuit 200, particularly, read/write control of a buffer read circuit 211, a transfer region write circuit 212, a transfer region read circuit 220, and a buffer write circuit 221 in response to a transfer command from the DSP 120, and such control as above is executed by the main control circuit 230 as a processor, for example.

The buffer read circuit 211 is a circuit for reading out read transfer data stored in the input/output buffer 300 (it corresponds to the audio stream data in this embodiment) by the predetermined processing unit (a single word, for example) through the buffer read access circuit 210.

The transfer region write circuit 212 is a circuit for writing the read transfer data read out from the input/output buffer 300 by the buffer read circuit 211 into the memory cell 112 for transfer region 0 by the predetermined processing unit (a single word, for example). The transfer region write circuit 212 outputs a read transfer completion flag to the main control circuit 230 when writing of the read transfer data is finished.

A selector 213 selects read transfer data supplied from the transfer region write circuit 212, and outputs the selected data to the memory cell 112 for transfer region 0, in the case of writing the read transfer data in the memory cell 112 for transfer region 0, according to a transfer mode flag 0 supplied from the main control circuit 230. Also, the selector 213 selects DSP write data supplied from the DSP core 120, and outputs the selected data to the memory cell 112 for transfer region 0, in the case of writing the write data such as decode data supplied from the DSP core 120 (hereinafter referred to as DSP write data), in the memory cell 112 for transfer region 0.

A selector 223 selects data read out from the memory cell 112 for transfer region 0 or 0 data, and outputs the selected data to a selector 226 according to the transfer mode flag 0 supplied from the main control circuit 230.

A selector 214 selects read transfer data supplied from the transfer region write circuit 212, and outputs the selected data to the memory cell 113 for transfer region 1, in the case of writing the read transfer data in the memory cell 113 for transfer region 1, according to a transfer mode flag 1 supplied from the main control circuit 230. Also, the selector 214 selects the DSP write data supplied from the DSP core 120, and outputs the selected data to the memory cell 113 for transfer region 1, in the case of writing the DSP write data in the memory cell 113 for transfer region 1.

A selector 224 selects data read out from the memory cell 113 for transfer region 1 or 0 data, and outputs the selected data to a selector 226, according to the transfer mode flag 1 supplied from the main control circuit 230.

A selector 225 selects the write transfer data read out from the memory cell 112 for transfer region 0, and outputs the selected data to the transfer region read circuit 220, in the case that data stored in the transfer region 0 is the write transfer data, according to the transfer mode flag 0 supplied from the main control circuit 230. Also, the selector 225 selects the write transfer data read out from the memory cell 113 for transfer region 1, and outputs the selected data to the transfer region read circuit 220, in the case that the data stored in the transfer region 1 is the write transfer data.

The transfer region read circuit 220 is a circuit for reading out the write transfer data from the memory cell 112 for transfer region 0 or the memory cell 113 for transfer region 1 through the selector 225 by the predetermined processing unit (a single word, for example). The transfer region read circuit 220 outputs a write transfer completion flag to the main control circuit 230 when reading-out of the write transfer data is finished.

The buffer write circuit 221 is a circuit for writing the write transfer data read out from the transfer region read circuit 220 into the input/output buffer 300 through the buffer write access circuit 222 by the predetermined processing unit (a single word, for example).

A selector 226 selects any one of the data read out from the memory cell 112 for transfer region 0 output from the selector 223, data read out from the memory cell 113 for transfer region 1 output from the selector 224, or normal data read out from the normal region memory cell 111, and outputs the selected data to the DSP core 120 as the DSP read data according to a request from the DSP core 120.

<Operation According to Read Transfer of Data Transfer Control Circuit>

Figure 3:
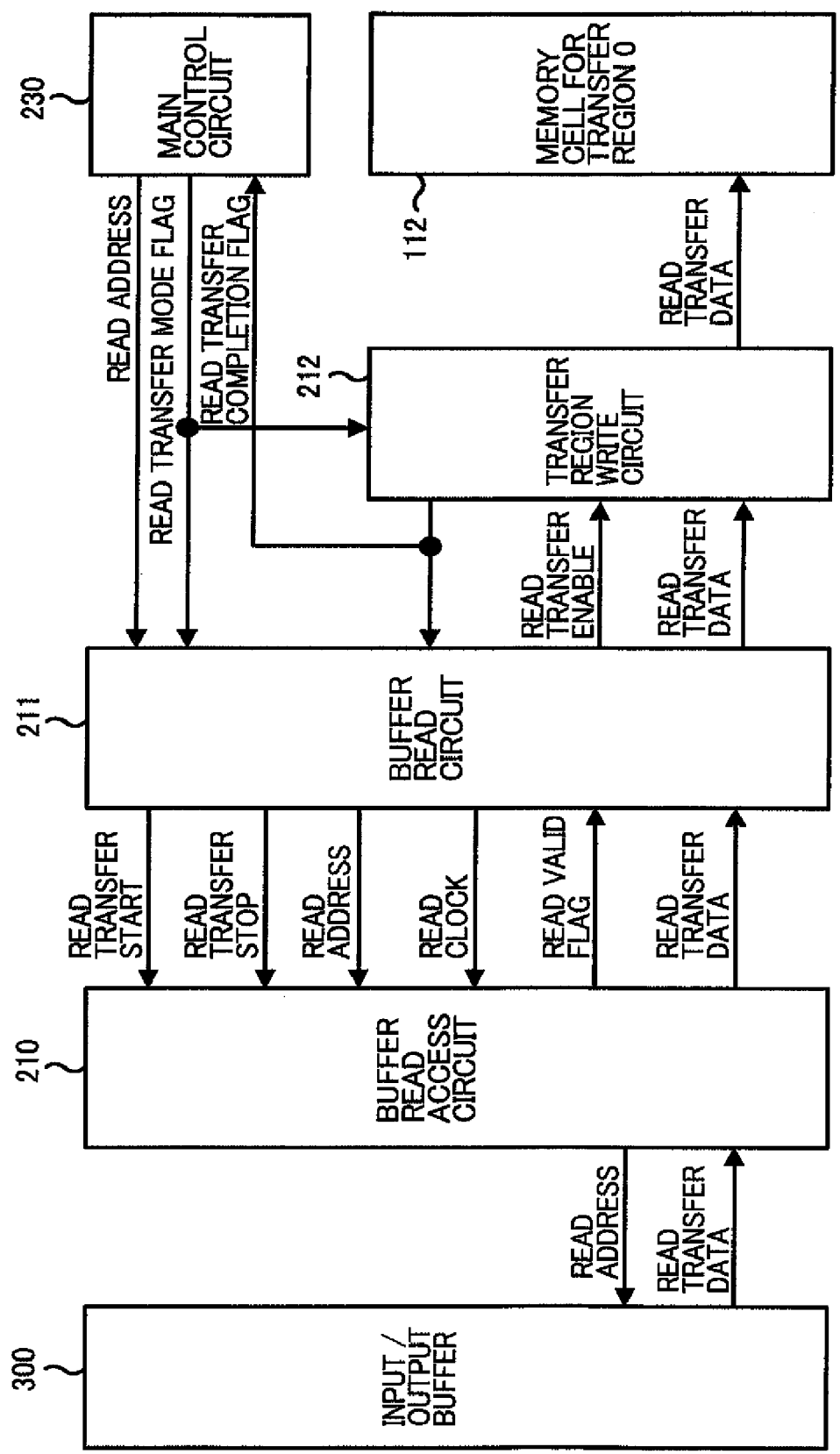
FIG. 3 is a system configuration diagram according to read transfer of a data transfer control circuit according to an embodiment of the present invention.
Figure 4:
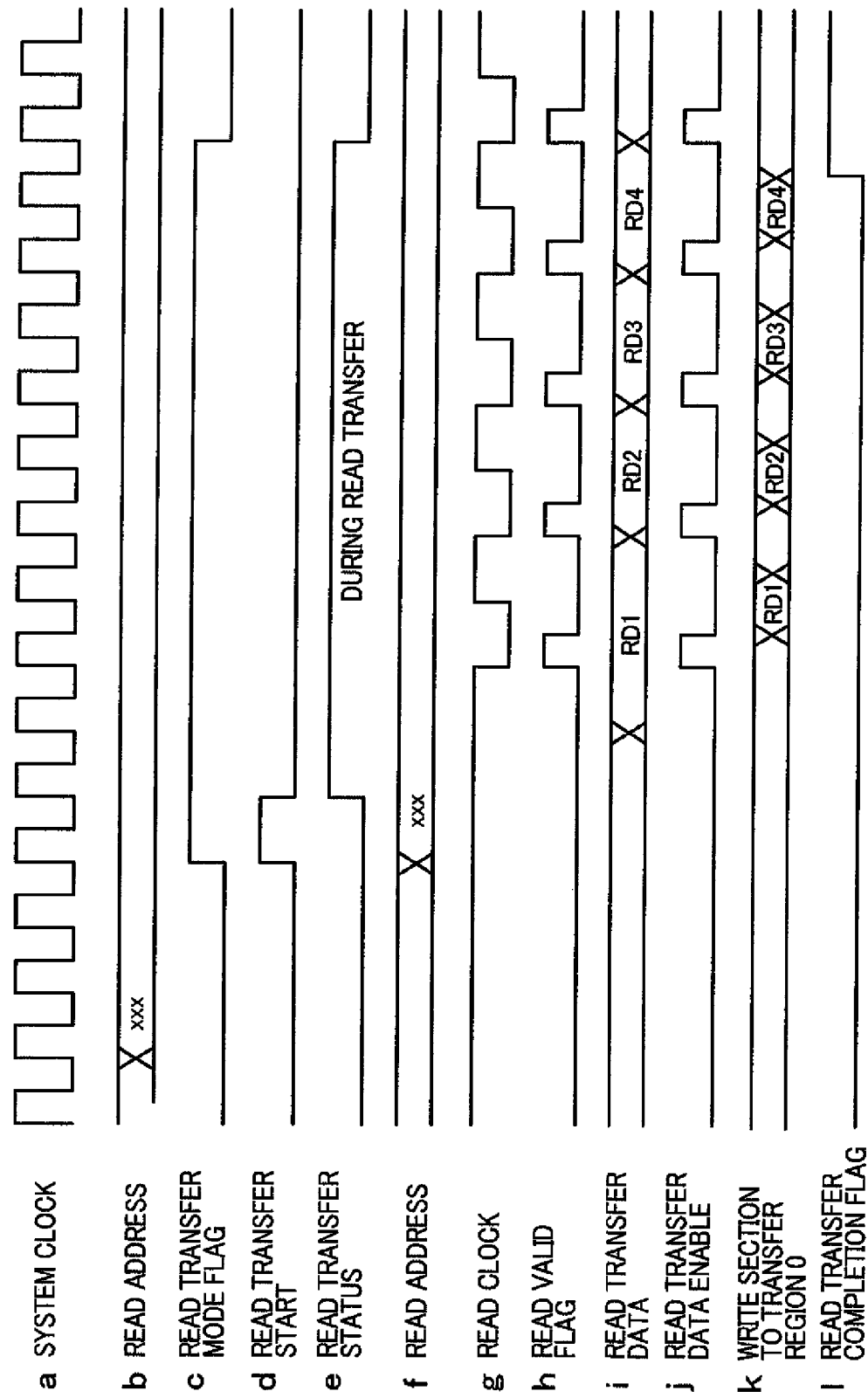
FIG. 4 is a timing chart of major signals in the system configuration shown in FIG. 3.
Figure 5:
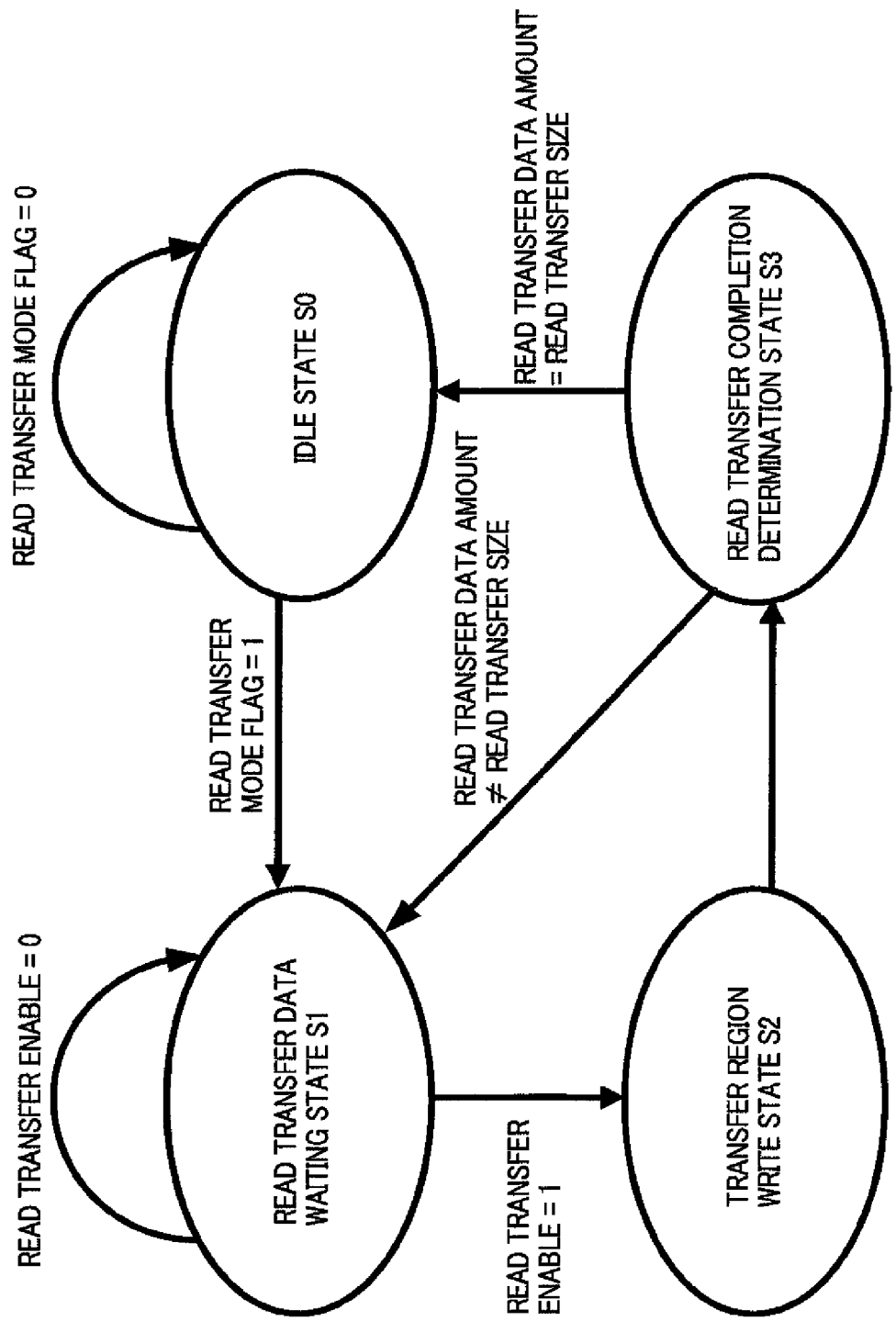
FIG. 5 is a state transition diagram of a transfer region write circuit according to an embodiment of the present invention.

With Reference to FIGS. 3 to 5, there will hereinafter be described an operation according to read transfer of the data transfer control circuit 200 when the memory cell 112 for transfer region 0 is selected as a read transfer destination. FIG. 3 is a system configuration diagram according to read transfer of the data transfer control circuit 200, FIG. 4 is a timing chart of major signals in the system configuration shown in FIG. 3, and FIG. 5 is a state transition diagram of the transfer region write circuit 212.

The main control circuit 230 supplies a read address to the buffer read circuit 211 (See b in FIG. 4) and then, sets from "0" to "1" a read transfer mode flag (first transfer mode flag) for providing notification of the transfer start of the read transfer data (stream data) for the buffer read circuit 211 and the transfer region write circuit 212 (See c in FIG. 4).

When the buffer read circuit 211 recognizes that the read transfer mode flag has become "1", it: gives a read transfer start command to the buffer read access circuit 210 (See d in FIG. 4); supplies the read address supplied from the main control circuit 230 to the buffer read access circuit 210 (See f in FIG. 4); and switches a read transfer status from "0 (stop)" to "1 (during read transfer)" after a predetermined time has elapsed (See e in FIG. 4).

In response to the read transfer status having become "1 (during read transfer)," the buffer read access circuit 210 receives from the buffer read circuit 211 a read clock (See g in FIG. 4) obtained by performing predetermined frequency dividing of a system clock (See a in FIG. 4). And the buffer read access circuit 210 reads out the read transfer data from the input/output buffer 300 based on the read clock and the read address supplied from the buffer read access circuit 210. When described in detail, the buffer read access circuit 210 sets a read valid flag to "1" for a predetermined period at every falling edge of the read clock (See g, h in FIG. 4) and reads out the read transfer data in the predetermined processing units (a single word, for example) from the input/output buffer 300 while the read valid flag is "1" (See h, i in FIG. 4).

On the other hand, to the transfer region write circuit 212, read transfer enable (same as the read valid flag) and the read transfer data are supplied from the buffer read circuit 211 (See h, i, j in FIG. 4). The transfer region write circuit 212 writes the read transfer data in predetermined processing units supplied from the buffer read circuit 211 into the memory cell 112 for transfer region 0 every time the read transfer enable becomes "1" (See j, k in FIG. 4).

On the other hand, the transfer region write circuit 212 writes the read transfer data supplied from the buffer read circuit 211 into the memory cell 112 for transfer region 0 by predetermined processing units (a single word, for example) according to the state transition diagram shown in FIG. 5. That is, when the read transfer mode flag supplied from the main control circuit 230 has been switched from "0" to "1," the transfer region write circuit 212 changes from an idle state S0 to a read transfer data waiting state S1 of waiting for the read transfer data from the buffer read circuit 211. When in the read transfer data waiting state S1, the read transfer enable has been switched from "0" to "1," the transfer region write circuit 212 changes to a transfer region write state S2 in which the read transfer data is written into the memory cell 112 for transfer region 0.

The transfer region write circuit 212 is provided with a function of counting an amount of read transfer data written into the memory cell 112 for transfer region 0. Here, the transfer region write circuit 212 changes to a read transfer completion determination state S3 in which whether or not the read transfer data amount reaches a read transfer data size set in advance according to the transfer command from the DSP core 120 is determined.

The transfer region write circuit 212 changes to the read transfer data waiting state S1 again, if the read transfer data amount does not reach the read transfer data size in the read transfer completion determination state S3, on the other hand, the circuit returns to the initial idle state S0, if the read transfer data amount reaches the read transfer data size.

When having returned to the idle state S0, the transfer region write circuit 212 sets the read transfer completion flag (first transfer completion flag) from "0" to "1," to be supplied to the main control circuit 230 and the buffer read circuit 211 (See 1 in FIG. 4). As a result, the main control circuit 230 resets the read transfer mode flag to "0," and the buffer read circuit 211 switches the read transfer status from "1" to "0" (See e, 1 in FIG. 4). By the above operation, the read transfer by the data transfer control circuit 200 is completed.

<Operation According to Write Transfer of Data Transfer Control Circuit>

Figure 6:
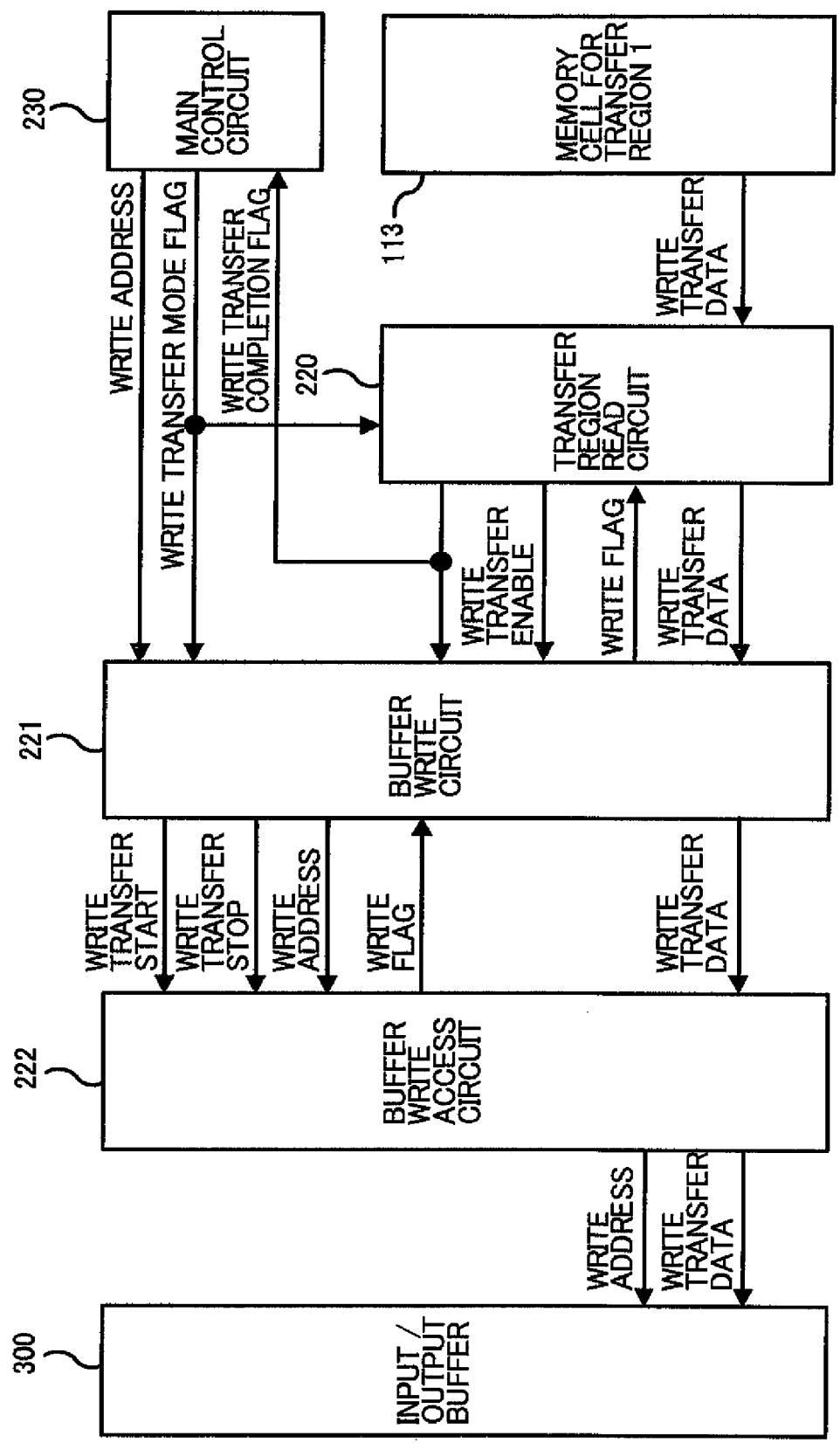
FIG. 6 is a system configuration diagram according to write transfer of a data transfer control circuit according to an embodiment of the present invention.
Figure 7:
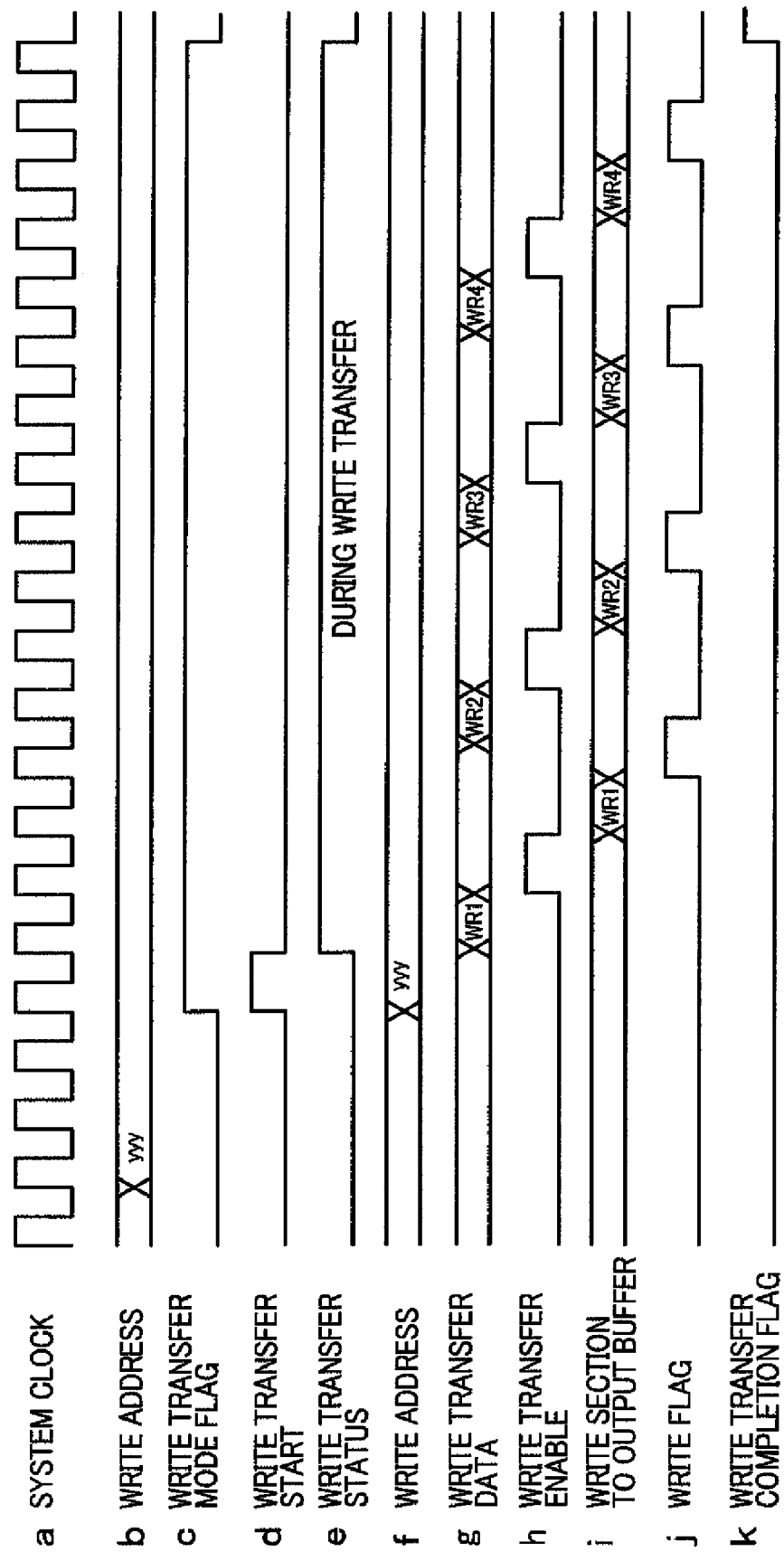
FIG. 7 is a timing chart of major signals in the system configuration shown in FIG. 6.
Figure 8:
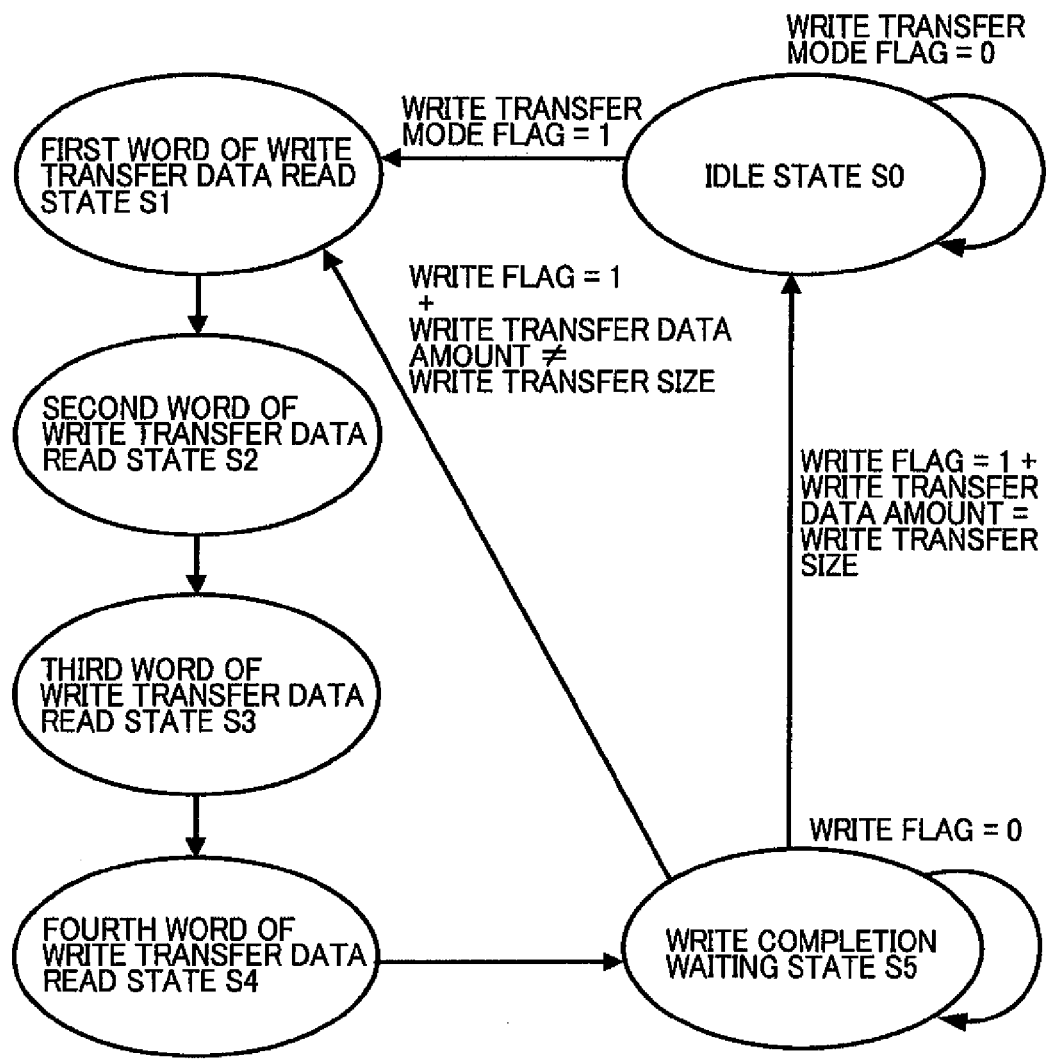
FIG. 8 is a state transition diagram of a transfer region read circuit according to an embodiment of the present invention.
Figure 9:
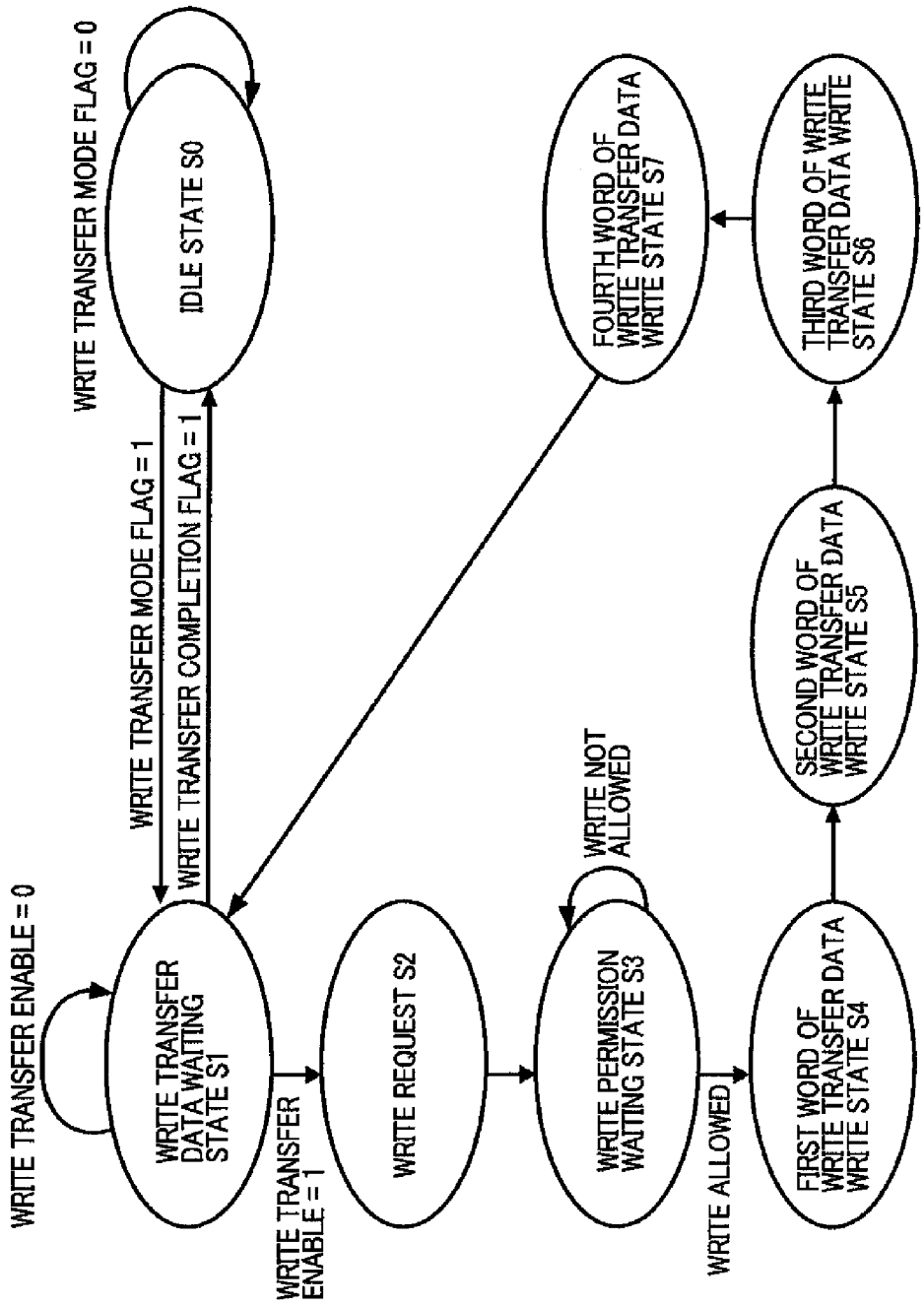
FIG. 9 is a state transition diagram of a buffer write circuit according to an embodiment of the present invention.

With Reference to FIGS. 6 to 9, there will be described an operation according to write transfer of the data transfer control circuit 200 when the memory cell 113 for transfer region 1 is selected as a write transfer source. FIG. 6 is a system configuration diagram according to the write transfer of the data transfer control circuit 200, FIG. 7 is a timing chart of major signals in the system configuration shown in FIG. 6, FIG. 8 is a state transition diagram of the transfer region read circuit 220, and FIG. 9 is a state transition diagram of the buffer write circuit 221.

The main control circuit 230 receives a write transfer command from the DSP core 120 and supplies a write address to the buffer write circuit 221 (See b in FIG. 7) and then, sets from "0" to "1" a write transfer mode flag (second transfer mode flag) for providing notification of transfer start of write transfer data (decode data) for the buffer write circuit 221 and the transfer region read circuit 220 (See c in FIG. 7).

The transfer region read circuit 220 reads out the write transfer data from the memory cell 113 for transfer region 1 according to the state transition diagram shown in FIG. 8. That is, after the write transfer mode flag supplied from the main control circuit 230 has been switched from "0" to "1," the transfer region read circuit 220 changes from the idle state S0 to the states S1 to S4 in which the write transfer data for 4 words corresponding to one frame is read out from the memory cell 113 for transfer region 1.

And when the reading-out of the write transfer data for 4 words from the memory cell 113 for transfer region 1 has been completed, the transfer region read circuit 220 sets the write transfer enable to "1" (See g, h in FIG. 7) and then, changes to a write completion waiting state S5 of waiting until the write flag, which indicates the completion of writing of the write transfer data for 4 words into the input/output buffer 300 by the buffer write circuit 221, becomes "1" (See i, j in FIG. 7).

The transfer region read circuit 220 is provided with a function of counting an amount of write transfer data read out from the memory cell 113 for transfer region 1. When the writing of the write transfer data for 4 words by the buffer write circuit 221 has been completed and the write flag has become "1," the transfer region read circuit 220 determines whether or not the write transfer data amount reaches a write transfer data size set in advance by a write transfer command from the DSP core 120.

If the write transfer data amount does not reach the write transfer data size, the transfer region read circuit 220 changes to the states S1 to S4 in which the write transfer data for the subsequent 4 words is read out, on the other hand, if the write transfer data amount reaches the write transfer data size, the write transfer completion flag (second transfer completion flag) is set to "1" and returns to the initial idle state S0. As a result, the main control circuit 230 resets the write transfer mode flag to "0."

As mentioned above, reading-out of the write transfer data from the memory cell 113 for transfer region 1 by the transfer region read circuit 220 is completed.

On the other hand, when the buffer write circuit 221 recognizes that the write transfer mode flag has become "1," it: gives a write transfer start command to the buffer write access circuit 222 (See d in FIG. 7); supplies the write address supplied from the main control circuit 230 to the buffer write access circuit 222 (See f in FIG. 7); and switches a write transfer status from "0 (stop)" to "1 (during write transfer)" (See e in FIG. 7) after a predetermined time has elapsed.

In response to a write transfer stop command having become "1 (during write transfer)," the buffer write circuit 221 supplies: a write clock obtained by performing predetermined frequency dividing of a system clock (See a in FIG. 7) and; the write transfer data read out by the transfer region read circuit 220, to the buffer write access circuit 222. As a result, the buffer write access circuit 222 writes the write transfer data into the input/output buffer 300 based on the write address and write clock supplied from the buffer write circuit 221.

The buffer write circuit 221 writes the write transfer data into the input/output buffer 300 according to the state transition diagram shown in FIG. 9. That is, when the write transfer mode flag supplied from the main control circuit 230 has been switched from "0" to "1," the buffer write circuit 221 changes from the idle state S0 to the write transfer data waiting state S1 of waiting for the write transfer data for 4 words from the transfer region read circuit 220.

When the write transfer data for 4 words has been supplied and the write transfer enable has been switched from "0" to "1," the buffer write circuit 221 changes to a write request state S2 of outputting an arbiter request to the buffer write access circuit 222, and moreover, changes to a write permission waiting state S3 of waiting an arbiter permission AK from the buffer write access circuit 222.

When the buffer write circuit 221 receives the arbiter permission AK from the buffer write access circuit 222, the circuit changes to write states S4 to S7 of writing the write transfer data for 4 words into the input/output buffer 300 by the unit of 1 word. When writing of the write transfer data for 4 words has been finished, the buffer write circuit 221 changes to the write transfer data waiting state S1 again and repeats the above state transition till the writing of the write transfer data size set by the DSP core 120 is finished. When the writing of the write transfer data size is finished, the buffer write circuit 221 returns to the idle state S0 according to the write transfer completion flag set to "1" by the transfer region read circuit 220. By the above operation, the write transfer by the data transfer control circuit 200 will be finished.

According to the present embodiment, there can be provided a stream data reproducing system including DSP with reduced processing load according to data transfer with the input/output buffer.

The above embodiments of the present invention are simply for facilitating the understanding of the present invention and are not in any way to be construed as limiting the present invention. The present invention may variously be changed or altered without departing from its spirit and encompass equivalents thereof.

It is claimed:

1. A stream data reproducing system comprising:
  an input buffer configured to accumulate stream data input from a stream source;
  a decoder core circuit configured to decode the stream data accumulated in the input buffer to generate decoded data;
  an output buffer configured to output the decoded data after accumulation thereof;
  a transfer memory cell configured to store the stream data accumulated in the input buffer and the decoded data generated in the decoder core circuit; and
  a data transfer control circuit configured to control transfer of the stream data from the input buffer to the transfer memory cell, and transfer of the decoded data from the transfer memory cell to the output buffer, the data transfer control circuit further comprising:
    a buffer read circuit configured to read out the stream data from the input buffer;
    a transfer region write circuit configured to write the stream data read out from the buffer read circuit into the transfer memory cell;
    a transfer region read circuit configured to read out the decoded data from the transfer memory cell;
    a buffer write circuit configured to write the decoded data read out by the transfer region read circuit into the output buffer; and
    a main control circuit configured to control the buffer read circuit, the transfer region write circuit, the transfer region read circuit, and the buffer write circuit, wherein
  the main control circuit receives a command for transferring of the stream data from the decoder core circuit and outputs a first transfer mode flag for providing notification of transfer start of the stream data for the buffer read circuit and the transfer region write circuit, and wherein
  the transfer region write circuit writes the stream data read out by the buffer read circuit in a predetermined transfer size into the transfer memory cell according to the first transfer mode flag, and thereafter outputs a first transfer completion flag for resetting the first transfer mode flag.

2. The stream data reproducing system of claim 1, further comprising
  a plurality of the transfer memory cells, wherein
  the data transfer control circuit selects any one of the plurality of the transfer memory cells as a transfer destination of the stream data or a transfer source of the decoded data.

3. The stream data reproducing system of claim 2, wherein
  the plurality of the transfer memory cells are accessed by the decoder core circuit as data memory during a period except when transfer of the stream data or transfer of the decoded data is performed.

4. A stream data reproducing system, comprising:
  an input buffer configured to accumulate stream data input from a stream source;
  a decoder core circuit configured to decode the stream data accumulated in the input buffer to generate decoded data;
  an output buffer configured to output the decoded data after accumulation thereof;
  a transfer memory cell configured to store the stream data accumulated in the input buffer and the decoded data generated in the decoder core circuit; and
  a data transfer control circuit configured to control transfer of the stream data from the input buffer to the transfer memory cell, and transfer of the decoded data from the transfer memory cell to the output buffer, the data transfer control circuit further comprising:
    a buffer read circuit configured to read out the stream data from the input buffer;
    a transfer region write circuit configured to write the stream data read out from the buffer read circuit into the transfer memory cell;
    a transfer region read circuit configured to read out the decoded data from the transfer memory cell;
    a buffer write circuit configured to write the decoded data read out by the transfer region read circuit into the output buffer; and
    a main control circuit configured to control the buffer read circuit, the transfer region write circuit, the transfer region read circuit, and the buffer write circuit,
  wherein the main control circuit receives a command for transferring of the decoded data from the decoder core circuit, and outputs a second transfer mode flag for providing notification of transfer start of the decoded data for the transfer region read circuit and the buffer write circuit, and wherein
  the transfer region read circuit reads out the decoded data from the transfer memory cell in a predetermined transfer size, to be written into the output buffer by the buffer write circuit, according to the second transfer mode flag, and thereafter outputs a second transfer completion flag for resetting the second transfer mode flag.

5. The stream data reproducing system of claim 4, further comprising
  a plurality of the transfer memory cells, wherein
  the data transfer control circuit selects any one of the plurality of the transfer memory cells as a transfer destination of the stream data or a transfer source of the decoded data.

6. The stream data reproducing system of claim 5, wherein
  the plurality of the transfer memory cells are accessed by the decoder core circuit as data memory during a period except when transfer of the stream data or transfer of the decoded data is performed.

* * * * *